Patented Dec. 5, 1933

1,937,613

UNITED STATES PATENT OFFICE 1,937,613

MANUFACTURE OF CALCIUM HYPO-CHLORITE

Matthew Weber, Jr., Niagara Falls, N. Y., assignor to The Mathieson Alkali Works, Inc., New York, N. Y., a corporation of Virginia No Drawing. Application January 14, 1932
Serial No. 586,706

4 Claims. (Cl. 23—86)

This invention relates to improvements in the production of calcium hypochlorite products. In the manufacture of calcium hypochlorite products it is usually desirable to make products that are free from calcium chloride or contain but a minimum of calcium chloride for several reasons. In particular, calcium chloride is very hygroscopic and makes the product difficult to dry when present in substantial amount, and this same property of calcium chloride also tends to make the product unstable when it contains calcium chloride in substantial amount. The present invention provides an improved method of producing calcium hypochlorite products substantially free from calcium chloride.

Letters Patent Numbers 1,713,650 and 1,787,048, granted to The Mathieson Alkali Works, Inc. on applications of Anthony George and Robert B. MacMullin, and R. B. MacMullin and Maurice C. Taylor, respectively, describe methods of producing calcium hypochlorite substantially free from calcium chloride involving, for example, reaction between chlorinated lime slurries and either the salt $NaOCl \cdot 5H_2O$ or the triple salt $Ca(OCl)_2 \cdot NaOCl \cdot NaCl \cdot 12 H_2O$. In order to increase the calcium hypochlorite content of the product, the chlorinated lime slurry may be filtered or centrifuged to produce a cake containing calcium hypochlorite and calcium chloride and the reaction carried out with this cake instead of with the chlorinated lime slurry. In one aspect, this invention is an improvement on these methods.

According to the present invention, an intermediate calcium hypochlorite product is similarly separated from the solution or slurry in which it is formed and caused to react with a sodium hypochlorite compound, but, in the combined operation of this invention, this intermediate calcium hpochlorite product is separated as a basic calcium hypochlorite instead of as a neutral calcium hypochlorite. Several advantages are thus secured. In particular, the basic calcium hyphochlorites are of better crystal form than neutral calcium hypochlorite and, as a consequence, better separation, either by filtration or by centrifuging, of the intermediate from the solution of slurry containing calcium chloride can be effected.

The basic calcium hypochlorite is formed by precipitation from an aqueous solution containing calcium, chloride, hypochlorite and hydroxyl ions, for example, either by controlled chlorination of an aquous lime slurry or by the addition of lime to an aqueous solution containing calcium hypochlorite and calcium chloride, both of these alternative procedures being individually well known. The basic calcium hypochlorites comprise those compounds which may be represented by the formula $Ca(OCl)_2 \cdot XCa(OH)_2$. The monobasic compound, the dibasic compound and mixtures of these compounds, for example, are useful in carrying out the invention.

In the combined operation of the present invention, the separated basic calcium hypochlorite is chlorinated, usually with the addition of water, until the basic calcium hypochlorite has been converted to calcium hypochlorite and calcium chloride. This chlorinated intermediate is then caused to react with a sodium hypochlorite compound, sodium hypochlorite or the triple salt above mentioned for example, and the reaction mixture is dried to produce the calcium hypochlorite product of the invention. By using an amount of the sodium hypochlorite compound such that the contained sodium hypochlorite is at least approximately equivalent to the calcium chloride content of the reactants, a calcium hypochlorite product substantially free from calcium chloride can be produced.

The invention will be further illustrated by the following more detailed examples, but it will be understood that the invention is not limited thereto:

Example I

A filter cake of dibasic calcium hypochlorite separated by filtration from a chlorinated lime slurry having a composition, approximately, as follows:

| | Percent |
|---|---|
| $Ca(OCl)_2$ | 35.0 |
| $Ca(OH)_2$ | 36.2 |
| $CaCl_2$ | 6.1 |
| $H_2O$ | 22.7 | is diluted with 1.88 parts (all parts by weight) of water per part of cake and chlorinated with about 0.35 parts of chlorine per part of cake. The resulting slurry is caused to react with 0.97 parts of $NaOCl \cdot 5H_2O$ per part of cake originally used and the reaction product is dried. The product contains about 71% $Ca(OCl)_2$.

Example II

A filter cake of dibasic calcium hypochlorite separated by filtration from a chlorinated lime slurry, of the same composition as the cake mentioned in the first example, is diluted with 3.34 parts of water per part of cake and chlorinated with about .035 parts of chlorine per part of cake. The resulting slurry is caused to react with 0.84 parts of Ca(OCl)$_2$·NaOCl·NaCl·12H$_2$O per part of cake originally used and the reaction product is dried. The product contains about 69% Ca(OCl)$_2$.

*Example III*

A filter cake of monobasic calcium hypochlorite separated by filtration from a chlorinated lime slurry having a composition, approximately, as follows:

| | Percent |
|---|---|
| Ca(OCl)$_2$ | 49.6 |
| Ca(OH)$_2$ | 24.0 |
| CaCl$_2$ | 5.6 |
| H$_2$O | 20.8 | is diluted with 1.70 parts of water per part of cake and chlorinated with about 0.23 parts of chlorine per part of cake. The resulting slurry is caused to react with 0.69 parts of NaOCl·5H$_2$O per part of cake originally used and the reaction product is dried. The product contains about 75% Ca(OCl)$_2$.

*Example IV*

A filter cake of monobasic calcium hypochlorite separated by filtration from a chlorinated lime slurry of the same composition as the cake mentioned in the third example is diluted with 2.74 parts of water per part of cake and chlorinated with 0.23 parts of chlorine per part of cake. The resulting slurry is caused to react with 0.65 parts of Ca(OCl)$_2$·NaOCl·NaCl·12H$_2$O per part of cake originally used. The product contains about 71% Ca(OCl)$_2$.

I claim:

1. The method of producing calcium hypochlorite which comprises precipitating basic calcium hypochlorite from an aqueous solution containing calcium, chloride, hypochlorite and hydroxyl ions, separating the precipitated basic calcium hypochlorite from the solution, chlorinating the separated basic calcium hypochlorite, causing the chlorinated intermediate to react with a sodium hypochlorite compound, and drying the reaction product.

2. The method of producing calcium hypochlorite which comprises chlorinating an aqueous lime slurry to precipitate basic calcium hypochlorite, separating the precipitated basic calcium hypochlorite from the slurry, chlorinating the separated basic calcium hypochlorite, causing the chlorinated intermediate to react with a sodium hypochlorite compound, and drying the reaction product.

3. The method of producing calcium hypochlorite which comprises precipitating basic calcium hypochlorite from an aqueous solution containing calcium hypochlorite and calcium chloride by the addition of lime, separating the precipitated basic calcium hypochlorite from the solution, chlorinating the separated basic calcium hypochlorite, causing the chlorinated intermediate to react with a sodium hypochlorite compound, and drying the reaction product.

4. The method of producing calcium hypochlorite which comprises precipitating basic calcium hypochlorite from an aqueous solution containing calcium, chloride, hypochlorite and hydroxyl ions, separating the precipitated basic calcium hypochlorite from the solution, chlorinating the separated basic calcium hypochlorite, causing the chlorinated intermediate to react with a sodium hypochlorite compound containing sodium hypochlorite in amount approximately equivalent to the calcium chloride content of the reactants, and drying the reaction product.

MATTHEW WEBER, Jr.

CERTIFICATE OF CORRECTION.

Patent No. 1,937,613.  December 5, 1933.

MATTHEW WEBER, JR.

It is hereby certified that error appears in the printed specification of the above numbered patent requiring correction as follows: Page 1, line 48, for "of" read or; line 54, for "aquous" read aqueous; and line 110, for ".035" read 0.35; and that the said Letters Patent should be read with these corrections therein that the same may conform to the record of the case in the Patent Office.

Signed and sealed this 9th day of January, A. D. 1934.

F. M. Hopkins
Acting Commissioner of Patents.

(Seal)